United States Patent [19]
Kondo et al.

[11] Patent Number: 5,533,167
[45] Date of Patent: Jul. 2, 1996

[54] HONEYCOMB HEATER ELEMENT HAVING FRONT REGION ADAPTED TO HEAT QUICKLY

[75] Inventors: Tomoharu Kondo, Toki; Masato Ogawa, Komaki; Keiji Noda, Nagoya, all of Japan

[73] Assignee: NGK Insulators, Ltd., Japan

[21] Appl. No.: 167,462

[22] Filed: Dec. 15, 1993

[30] Foreign Application Priority Data

Dec. 15, 1992 [JP] Japan .................... 4-334315
Nov. 30, 1993 [JP] Japan .................... 5-299464

[51] Int. Cl.⁶ ................ F01N 3/28; F01N 3/20; B01D 53/36; H05B 3/00
[52] U.S. Cl. .............. 392/485; 219/552; 60/300; 55/DIG. 30; 422/174
[58] Field of Search ................ 392/485–489; 219/552, 553, 505; 60/300; 55/DIG. 30; 422/174, 177, 179; 428/116

[56] References Cited

U.S. PATENT DOCUMENTS

| | | | |
|---|---|---|---|
| Re. 35,134 | 12/1995 | Mizuno et al. | 55/DIG. 30 |
| 4,505,726 | 3/1985 | Takeuchi et al. | 55/DIG. 30 |
| 4,662,911 | 5/1987 | Hirayama et al. | 55/DIG. 30 |
| 5,063,029 | 11/1991 | Mizuno et al. | |
| 5,194,229 | 3/1993 | Abe et al. | 422/174 |
| 5,202,547 | 4/1993 | Abe et al. | 219/552 |
| 5,202,548 | 4/1993 | Kondo et al. | 219/552 |
| 5,229,080 | 7/1993 | Abe et al. | 422/174 |
| 5,286,460 | 2/1994 | Abe et al. | 422/174 |
| 5,288,975 | 2/1994 | Kondo | 219/552 |
| 5,296,198 | 3/1994 | Abe et al. | 422/174 |
| 5,318,757 | 6/1994 | Abe et al. | 422/174 |
| 5,370,943 | 12/1994 | Bruck et al. | 422/174 |
| 5,393,586 | 2/1995 | Lipp | 219/552 |
| 5,433,926 | 7/1995 | Swars | 219/553 |
| 5,446,264 | 8/1995 | Kondo et al. | 219/552 |
| 5,449,541 | 9/1995 | Lipp et al. | 219/552 |

FOREIGN PATENT DOCUMENTS

| | | | |
|---|---|---|---|
| 483708 | 5/1992 | European Pat. Off. | |
| 4213261 | 10/1993 | Germany | |
| 3-23307 | 1/1991 | Japan | 422/177 |
| 5-171928 | 7/1993 | Japan | 60/300 |
| 663132 | 5/1979 | U.S.S.R. | 219/553 |
| WO92/13635 | 8/1992 | WIPO | |

*Primary Examiner*—John A. Jeffery
*Attorney, Agent, or Firm*—Parkhurst, Wendel & Burr

[57] ABSTRACT

A heating element for heating fluid flowing therethrough, including an electrically conductive honeycomb structure, electrodes electrically connected to the honeycomb structure for applying an electric current to the honeycomb structure, wherein the honeycomb structure has a front region which is adapted to heat more quickly than a back region of the honeycomb structure. To this end, the honeycomb structure may include at least one gap for obstructing electric current flow, the gap extending through the partition walls and terminating before reaching the front end of the honeycomb structure. Alternatively, the front region may be heated more quickly than the back region by providing at least one depression formed the back end of the honeycomb structure, such that the front region extends from a terminating end of the depression toward the front end of the honeycomb structure. A catalytic converter incorporating the heating element is also provided.

4 Claims, 6 Drawing Sheets

Fig.2
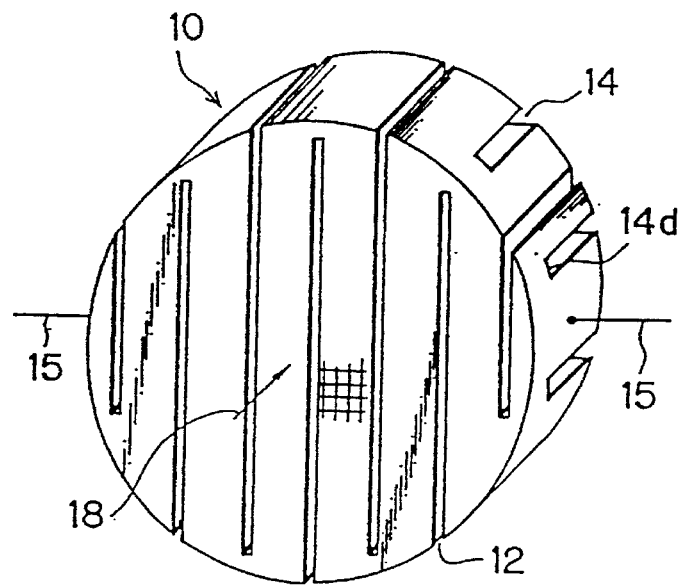
Prior Art
Fig.3(a)
Prior Art
Fig.3(b)
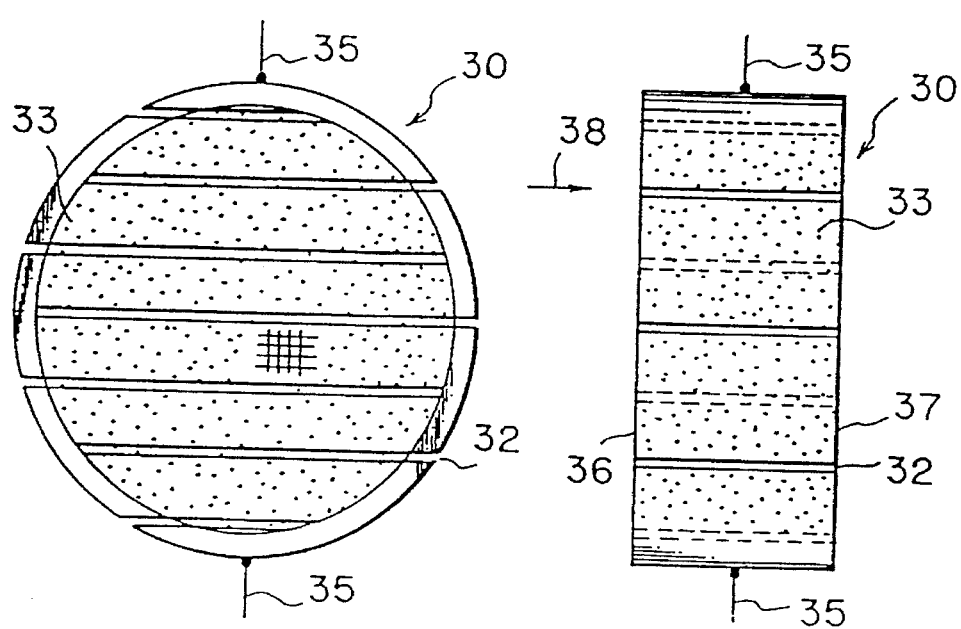

Fig.7(a)
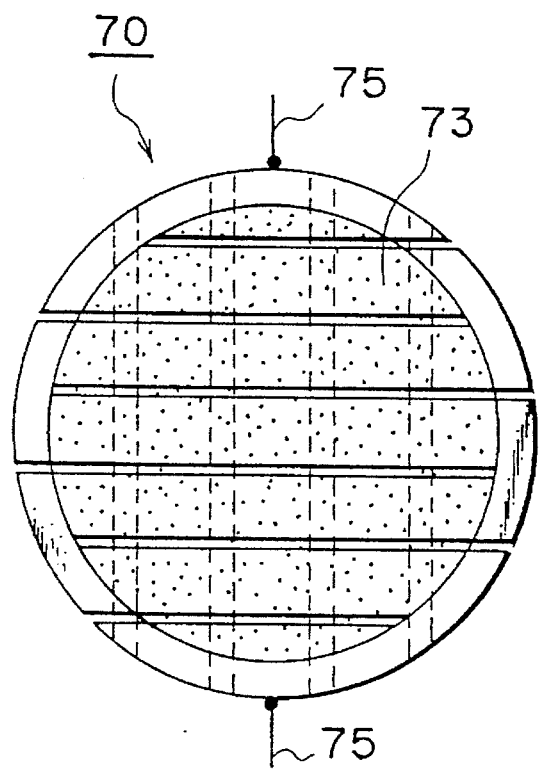
Fig.7(b)
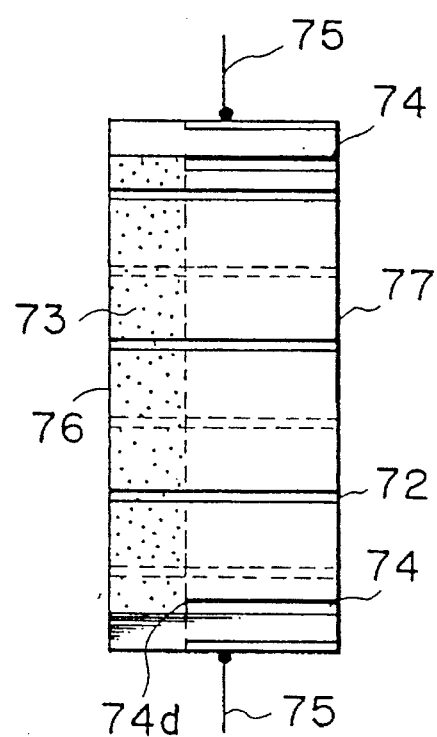
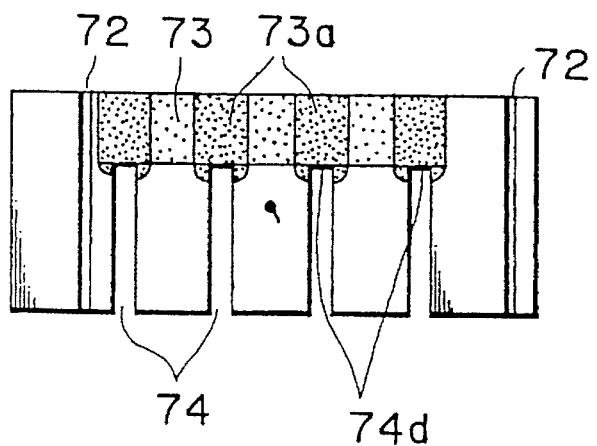
Fig.7(c)

HONEYCOMB HEATER ELEMENT HAVING FRONT REGION ADAPTED TO HEAT QUICKLY

BACKGROUND OF THE INVENTION

1. Field of the Invention

The present invention relates to a honeycomb heater which can be used as a preheater for controlling automobile exhaust emissions or as an industrial heater. The honeycomb heater may be used as a component in a catalytic converter for controlling automobile exhaust emission.

2. Description of the Related Art

Conventionally, porous ceramic honeycomb structures have been employed as carriers for a catalyst composition for removing, for example, nitrogen oxides, carbon monoxide, and hydrocarbons in the exhaust gas of internal combustion engines of automobiles. Recently, a honeycomb structure composed of a metallic material has drawn attention since the metallic honeycomb structure has high mechanical strength and heat resistance. The metallic honeycomb structure may be made by firing a green compact including metal powders.

As restriction of exhaust emission controls has been intensified, there has been a demand for heaters adapted to decrease pollutants during the initial running of the engine when the engine is not warmed up. The removal of hydrocarbons, carbon monoxide, nitrogen oxides while an exhaust gas is cold, is particularly important.

When the temperature of an exhaust gas is low during the initial running of the engine, the catalyst composition has a low activity for oxidizing hydrocarbons in the exhaust gas. The conversion rate of hydrocarbons by a catalyst composition is, for example, 5% or less when the exhaust gas is about 200° C., 50% when the exhaust gas is about 300° C., and at least 95% when the exhaust gas is about 400° C. Moreover, during the initial running of the engine, the engine emits a large amount of hydrocarbons as compared with hydrocarbons emitted during the continuous operation. Hence, it is preferable to heat the exhaust gas during the initial running of the engine to a light-off temperature above which the catalyst composition is sufficiently activated to remove pollutants in the exhaust gas.

An apparatus for controlling an exhaust gas of the engine in the exhaust system of automobile generally comprises a preheater and a main catalyst element (e.g. a three-way catalyst element), and the preheater is provided upstream of the main catalyst element.

Japanese Patent Application Laid-Open No. 295184/1991, which corresponds to U.S. Pat. No. 5,063,029, discloses a resistance adjusting type heater and a catalytic converter. This resistance adjusting type heater comprises an electrically conductive honeycomb structure, at least two electrodes in electrical contact with the honeycomb structure, and means for adjusting the electrical resistance of the honeycomb structure. The means may be a slit extending through partition walls defining passages of the honeycomb structure. A catalyst composition may be loaded onto surfaces of partition walls.

This resistance adjusting type heater can control its heat generation by regulating the electric resistance of the honeycomb structure. Preferably the heater reaches high temperatures in a short time with a high temperature elevation rate when it is subjected to post-heating (i.e. it is heated simultaneously with the start of the engine).

However, it still takes a somewhat long time to heat the entire honeycomb structure to the so-called light-off temperature of the catalyst composition. In order to reduce the heating time, it was attempted to reduce the volume of the heater so as to reduce a heat capacity of the honeycomb structure; however, it was difficult to treat hydrocarbons in an exhaust gas during the initial running of the engine, for example, during a period of up to about one minute from the time the engine is started.

SUMMARY OF THE INVENTION

The present inventors found that the aforementioned problem can be solved by selectively heating a front region of a honeycomb heater so as to activate a catalyst composition loaded onto the front region. In the front region, heat is generated by catalytic reactions for converting pollutants, and the heat is transferred to the other region thereby reducing time to entirely heat the honeycomb structure.

The first aspect of the present invention provides a heating element for heating fluid flowing therethrough, comprising a honeycomb structure having at least one gap for obstructing electric current which is passed through the heating element. The gap extends through the partition walls of the honeycomb structure from the back end toward the front end but does not reach the front end so that, upon applying the electric current to the honeycomb structure, a front region of the honeycomb structure heats more quickly than a back region of the honeycomb structure.

Preferably the at least one gap extends to a front half of the honeycomb structure.

In one embodiment of the invention, the honeycomb structure may further comprise at least one slit extending through the partition walls between the front end and the back end, wherein the front region is free from the at least one gap and the back region contains the at least one gap.

In another embodiment of the invention, the at least one first gap may extend to a dead end in a front half of the honeycomb structure, not reaching the front end; at least one second gap for obstructing electric current extends through the partition walls from the front end toward the back end beyond the dead end of the at least one first gap but not reaching the back end, the at least one second gap not intersecting the at least one first gap; and the front region of the honeycomb structure which contains a part of the at least one first gap and a part of the at least one second gap heats more quickly than a back region of the honeycomb structure which is free from the at least one second gap. Preferably the at least one first gap comprises a second slit.

In the second aspect of the present invention, a heating element for heating fluid flowing therethrough is provided, comprising: a honeycomb structure having a periphery, a front end, and a back end, including a plurality of passages which are defined by partition walls and extend in an axial direction of the honeycomb structure, the honeycomb structure being electrically conductive, whereby fluid flows through the passages from the front end to the back end; and means for applying electric current to the honeycomb structure so as to generate heat; wherein the back end is depressed so that, upon applying electric current to the honeycomb structure, a front region of the honeycomb structure which is located between the depression and the front end heats more quickly than a back region of the honeycomb structure.

Preferably, the means for applying electric current comprises at least two electrodes in electrical contact with the honeycomb structure. The honeycomb structure may further comprises a catalyst composition loaded on at least a part of the partition walls of the honeycomb structure, the catalyst composition comprising: an inorganic oxide resistant to heat; and a catalytically active component, loaded on the inorganic oxide, comprising an element selected from the group consisting of platinum, palladium, rhodium, and iridium. The honeycomb structure may be made by firing a green compact including a metal powder.

The third aspect of the present invention provides a catalytic converter for an exhaust gas of an engine, comprising: (A) a heating element including at least one gap for obstructing electric current which is passed through the heating element, the gap extending through the partition walls from the back end toward the front end but not reaching the front end so that, upon applying electric current to the honeycomb structure, a front region of the honeycomb structure heats more quickly than a back region of the honeycomb structure; and (B) a catalyst element, which is arranged downstream of the heating element, including monolithic structure and a catalyst composition loaded on at least a part of the partition walls of the monolithic structure. The catalyst composition comprises an inorganic oxide resistant to heat, and a catalytically active component, loaded on the inorganic oxide. The catalytically active component includes an element selected from the group consisting of platinum, palladium, rhodium, and iridium.

BRIEF DESCRIPTION OF THE DRAWINGS

FIG. 1(a) is a front view; FIG. 1(b) is a side view; and FIG. 1(c) is a bottom view.

FIG. 2 is a perspective view of the honeycomb heater of FIG. 1.

FIGS. 3(a) and 3(b) show a conventional honeycomb heater. FIG. 3(a) is a front view, and FIG. 3(b) is a side view.

FIG. 6(a) is a front view, and FIG. 6(b) is a cross-section through A—A' in FIG. 6(a).

FIGS. 7(a), 7(b), and 7(c) show another embodiment of the honeycomb heater of the present invention. FIG. 7(a) is a front view; FIG. 7(b) is a side view; and FIG. 7(c) is a bottom view.

FIG. 8(a) is a front view, and FIG. 8(b) is a side view.

FIG. 9(a) is a front view, and FIG. 9(b) is a side view.

DETAILED DESCRIPTION OF THE INVENTION

Figure 1A:
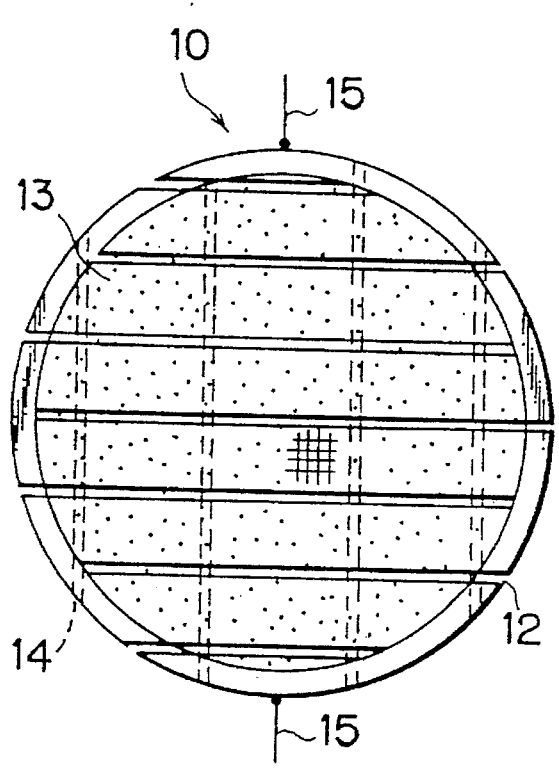
FIGS. 1(a), 1(b), and 1(c) show an embodiment of the honeycomb heater of the present invention.
Figure 1B:
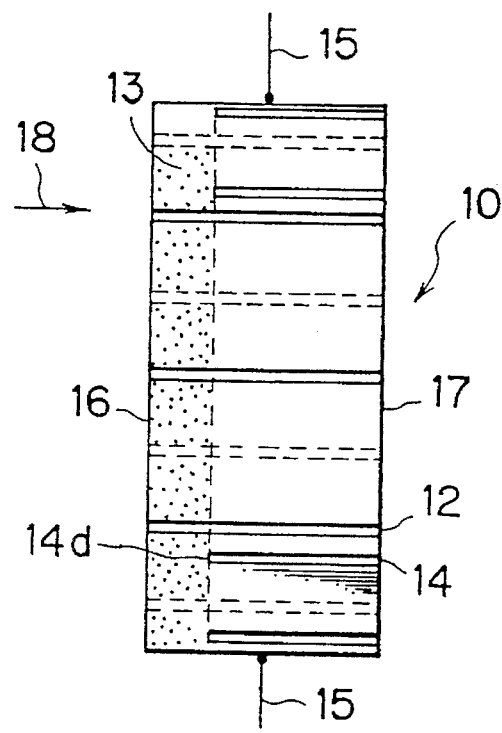
Figure 1C:
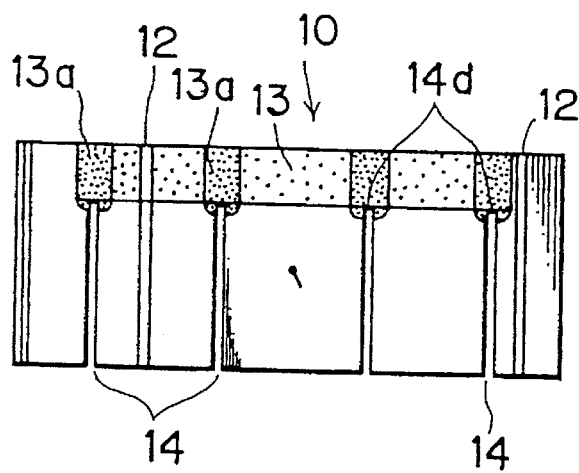

When a honeycomb heater in the exhaust system of an automobile engine is heated simultaneously with the start of the engine, the honeycomb heater preferably reaches high temperatures in a short time with a high temperature elevation rate.

When electric current selectively passes through a front region of the honeycomb structure of the honeycomb heater, the front region has a high temperature elevation rate than the remaining region of the honeycomb structure. Therefore, the catalyst composition in the front region is activated earlier than the back region; the heat generated in the catalytic reaction is transferred to the back region of the heater via (1) fluid passing through the passages of the honeycomb structure and (2) the heat conduction of the honeycomb structure.

For that purpose, the honeycomb structure has at least one slit extending from a back end of the honeycomb structure toward a front end but not reaching the front end. In the present specification, the termination of such a slit not reaching the other end of the honeycomb structure is called "dead end".

The honeycomb structure has means for applying electric current to the honeycomb structure so as to generate heat in the honeycomb structure. A pair of electrodes is preferably fitted onto a surface of the periphery of the honeycomb structure.

FIGS. 3(a) and 3(b) show a conventional honeycomb heater. A honeycomb structure 30 includes a plurality of passages which are defined by partition walls and which extend in an axial direction of the honeycomb structure. Slits 32 for obstructing electric current extend through the partition walls between a front end 36 and a back end 37. Electric current may be applied to the honeycomb structure 30 by lines 35. Each of the slits 32 is as thin as up to ten passages, and preferably up to five passages. Fluid may pass through a wide slit which has a width larger than ten passages. The slit 32 may be as thin as one or two passages.

FIGS. 1(a), 1(b), 1(c) and 2 show an embodiment of the honeycomb heater of the present invention. The honeycomb structure 10 includes slits 12 extending through partition walls between a front end 16 and a back end 17, similar to those in the conventional honeycomb structure of FIGS. 3(a) and 3(b). The honeycomb structure 10 further includes gaps 14 extending through partition walls from a back end 17 toward a front end 16 to a termination 14d. The gaps 14, however, do not reach the front end 16. Fluid can pass through the honeycomb structure from the front end 16 to the back end 17.

When electric current is applied to the honeycomb structure 10 through lines 15, the electric current is obstructed by slits 12 in a front region 13 which does not contain gaps 14. In contrast, the electric current is obstructed by slits 12 and gaps 14 in a back region which contains gaps 14 so that an electric path in the back region increases. As a result, more electric current flows through the front region 13 than the back region thereby more heat is generated in the front region 13 than the back region. Consequently, the front region 13 free from the gaps 14 heats more quickly than the back region containing the gaps 14.

Regions 13a are a part of the front region 13, and the regions 13a heats more quickly than the remaining regions in the front region 13. Each of the regions 13a is located from the termination 14d of one of the gaps 14 to the front end 16. A width of one of the regions 13a, which is perpendicular to the axial direction of the honeycomb structure 10, is larger than a thickness of the corresponding gap 14.

There is no limit in thickness of the gap as long as the gap obstructs electric current passing through the honeycomb structure. The gap includes the slit which has a limited width, and the gap may have a larger width than the slit does.

The gap having a large width may overlap a depression or a cavity formed in the back end.

In the embodiment of FIGS. 1(a), 1(b), 1(c), and 2, each of the gaps 14 is as thin as slit 12. However, the gaps 14 may have larger widths than slit 12.

For example, FIGS. 7(a), 7(b), and 7(c) show another embodiment in which each of the gaps 74 extending from the back end 77 to terminations 74d are wider than slits 72 extending between the front end 76 and the back end 77. The other elements of the embodiment is the same as the embodiment of FIGS. 1(a), 1(b), 1(c), and 2.

In the embodiment of FIGS. 1(a), 1(b), 1(c), and 2, gaps 14 intersect slits 12. However, gaps do not have to intersect slits. Whether gaps intersect slits or not, the front region free from the gaps heats more quickly than the back region containing the slits.

Figure 8A:
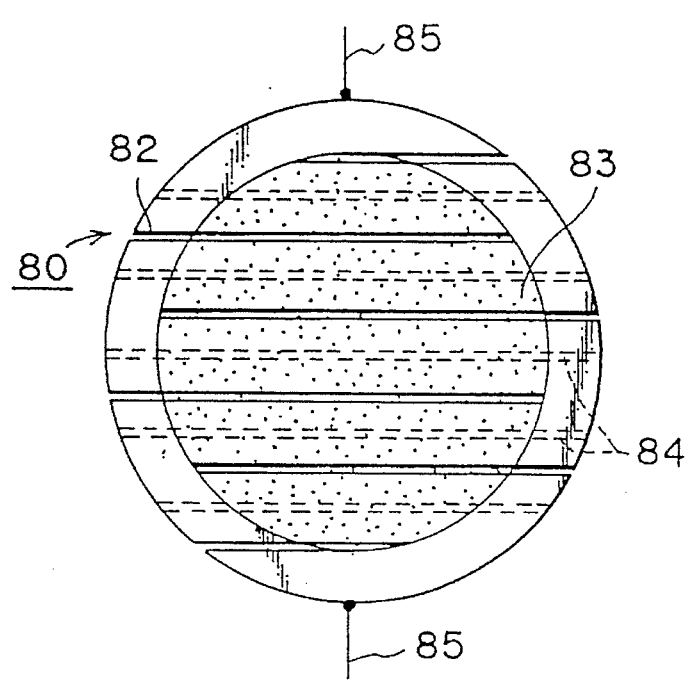
FIGS. 8(a) and 8(b) show another embodiment of the honeycomb heater of the present invention.
Figure 8B:
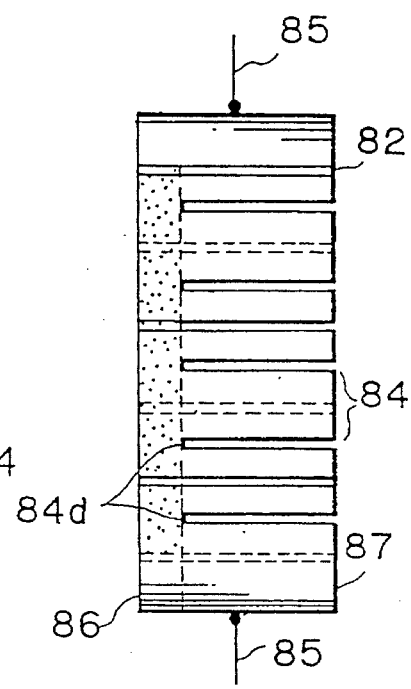

FIGS. 8(a) and 8(b) show another embodiment of the present invention in which gaps 84 do not intersect slits 82. Upon applying electric current to a honeycomb structure 80 by lines 85, a front region 83 free from gaps 84 heats more quickly than a back region containing the slits. Gaps 84 are substantially parallel to slits 82.

Figure 9A:
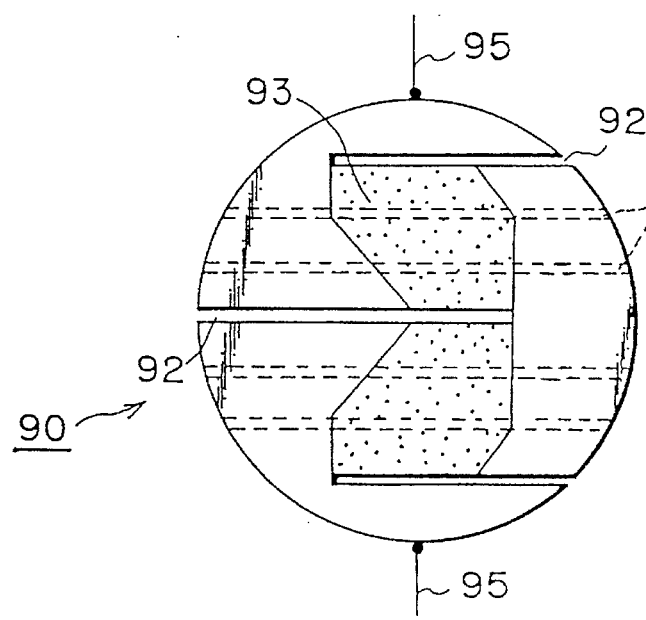
FIGS. 9(a) and 9(b) show another embodiment of the honeycomb heater of the present invention.
Figure 9B:
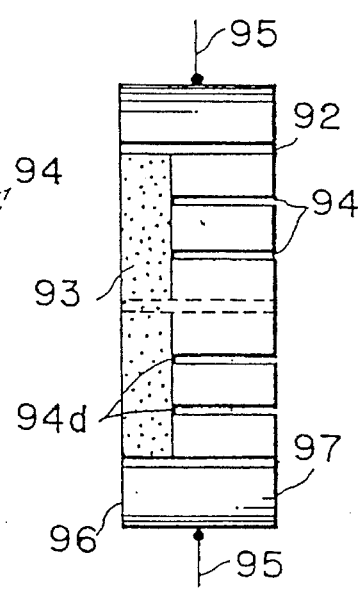

FIGS. 9(a) and 9(b) show another embodiment of the present invention in which gaps 94 do not intersect slits 92. Gaps 94 are substantially parallel to slits 92.

Gaps may make any angle with slits. A gap is not limited to be parallel to the other gaps, and a gap can make any angle with the other gaps. A gap may intersect with another gap. A slit can make any angle with the other slits. However, a slit preferably does not intersect another slit.

The termination 14d is preferably located in a front half of the honeycomb structure 10, and further preferably in a front one third of the honeycomb structure, thereby ensuring the front region 13 located in a frontal area of the honeycomb structure.

Figure 5:
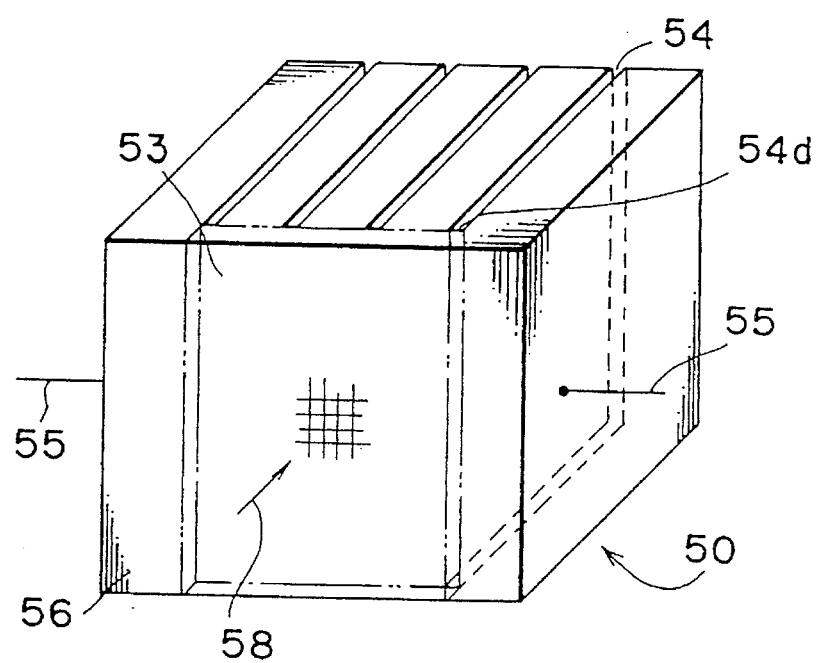
FIG. 5 is a perspective view of another embodiment of the honeycomb heater of the present invention.

In FIG. 5, a honeycomb structure 50 does not have slits between the front end and the back end. The honeycomb structure 50 has gaps 54 extending from the back end toward the front end 56. The gaps 54, however, does not reach the front end 56. Upon applying electric current to the honeycomb structure 50, a front region 53 which does not contain gaps 54 heats more quickly than a back region which contains gaps 54 for obstructing electric current.

Figure 4:
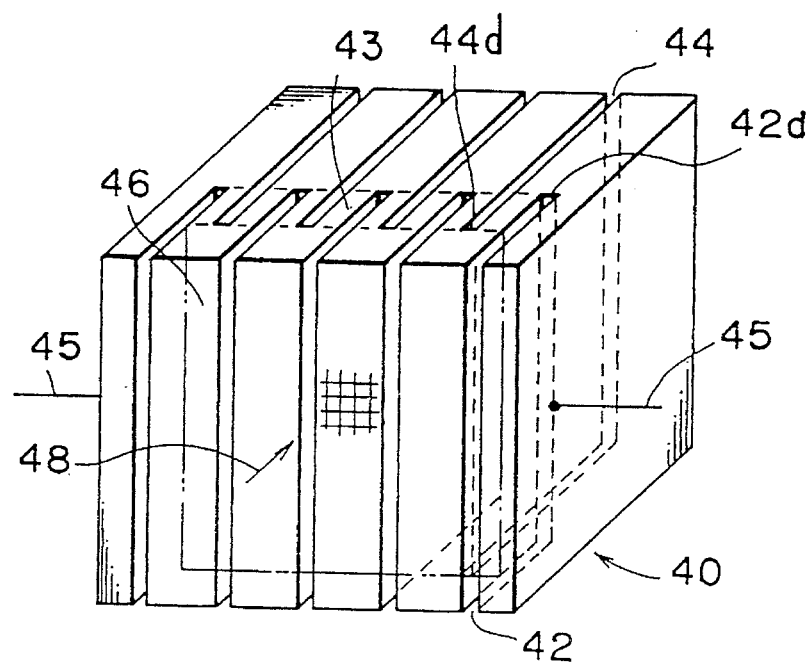
FIG. 4 is a perspective view of another embodiment of the honeycomb heater of the present invention.

FIG. 4 shows another embodiment of the honeycomb heater of the present invention. Gaps 44 extend from the back end of the honeycomb structure to terminations 44d toward the front end. Gaps 42 extend from the front end toward the back end beyond the dead ends 44d of the gaps 44. The gaps 43, however, do not reach the back end. In other words, along the axial direction of the honeycomb structure 40, terminations 44d are closer to the front end than terminations 42d.

Gaps 44 do not intersect gaps 42. Likewise, one of the gaps 44 do not intersect the other gaps 44, and one of the gaps 42 do not intersect the other gaps 42. One of the gaps 44 can make any angle with the other gaps 44. One of the gaps 42 can make any angle with the other gaps 42.

A front region 43 in the honeycomb structure 40 includes a part of gaps 44 and a part of gaps 42. Upon applying electric current to the honeycomb structure 40 through lines 45, electric current passes through the front region 43 by means of terminations 42d of gaps 42 and terminations 44d of gaps 44 so that the front region 43 heats more quickly than a back region which is free from gaps 42.

The front region 43 is preferably located closer to the front end than the back end of the honeycomb structure. The terminations 44d is preferably located in a front half of the honeycomb structure.

Figure 6A:
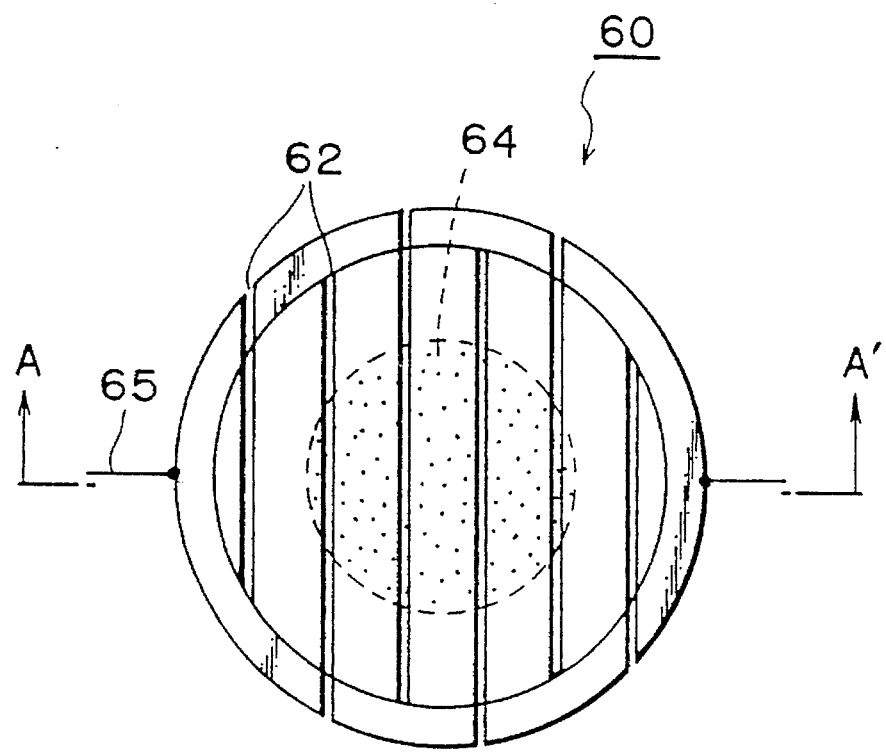
FIGS. 6(a) and 6(b) show another embodiment of the honeycomb heater of the present invention.
Figure 6B:
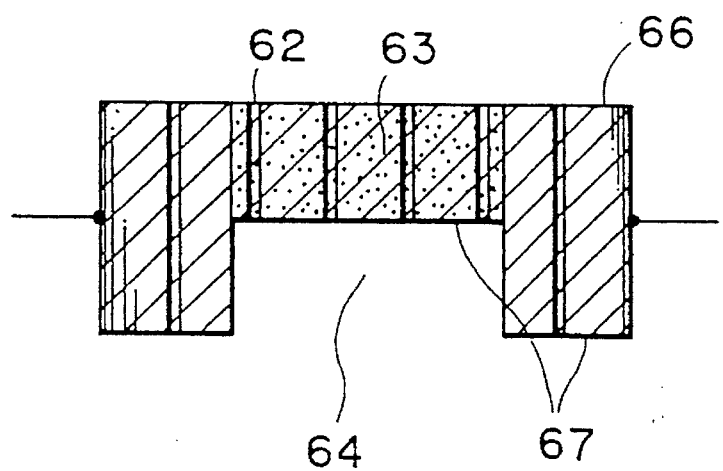

FIGS. 6(a) and 6(b) show another embodiment of the present invention. Slits 62 extends through partition walls between a front end 66 and a back end 67 of a honeycomb structure 60. The back end 67 is depressed so as to obstruct electric current. The depression of cavity 64 is not a through hole, and depression 64 does not reach the front end 66.

Upon applying electric current to the honeycomb structure 60, a front region 63 located between the depression 64 and the front end 63 heats more quickly than other regions, including a back region, of the honeycomb structure. The back region may refer to a region which surrounds the depression 64 in transverse directions.

In FIGS. 6(a) and 6(b), the depression 64 has a cylindrical shape. However, the shape of the depression is not limited, and the shape may include a polygonal column, a conical shape, a box, a semi-sphere, a paraboloid, etc.

Depression 64 is located in a center of the back end 67. However, a position of the depression is not limited, and a circumference in the back end 67 may be depressed.

A number of depressions is not limited. A plurality of depressions may be arranged in random in the back end 67.

The honeycomb structure of the honeycomb heater of the present invention is explained hereinafter. The honeycomb structure may have any shape, including a cylindrical shape and a box.

In the present invention, the honeycomb structure refers to a one-piece structure having a plurality of passages defined by partition walls. The passages can have various shapes in a cross section perpendicular to the axial direction. The cell shapes include a circle, a polygon including a quadrangle and a hexagon, a corrugated shape and the like. The passages preferably have a cell density of, for example, 6–1,500 cells/in$^2$ (0.9–233 cells/cm$^2$). The partition walls preferably have a thickness of 50–2,000 μm.

The honeycomb structure may or may not be porous. The porosity is not restricted. A porosity up to 50%, and favorably up to 25% is preferred in view of mechanical strength, oxidation resistance, and corrosion resistance of the honeycomb structure. When a catalyst composition is loaded onto the honeycomb structure, the porosity is preferably 5% or more in view of the adhesivity of the catalyst layer onto the honeycomb structure.

The honeycomb structure may be a foil type or a type produced by extruding a material powder into a green compact having a honeycomb shape and sintering the green compact. Either of the types can be used suitably. However, the latter type of a honeycomb structure is preferred because it is simply produced at a low cost.

An electrical resistance of the honeycomb heater of the present invention can be controlled at a desired level by gaps and slits in the honeycomb structure. The electrical resistance can be increased, for example, by increasing a number of slits and gaps so as to increase an electrical path in the honeycomb structure. The honeycomb structure preferably has an electrical resistance in the range of 0.001–0.5Ω.

On surfaces of passages of the honeycomb structure is preferably loaded a catalyst composition for adsorbing the harmful substances in the exhaust gas of automobile or for reacting with the harmful substances. The catalyst composition may comprise a carrier having a large surface area and a catalytically active component loaded thereon. Carriers include γ-$Al_2O_3$ type, $TiO_2$ type, $SiO_2$-$Al_2O_3$ type and a perovskite type. Examples of the catalytically active component are noble metals such as platinum, palladium, rhodium and the like, and base metals such as copper, cobalt and the like. A catalyst composition preferably contains particles of $\gamma$-$Al_2O_3$ as a carrier and platinum or palladium loaded on the particles in an amount of 10–100 g/ft$^3$ is preferred.

The honeycomb structure may be made of any material which is electrically conductive and which can generate heat when electricity is applied to the honeycomb structure. The material may therefore be metallic or ceramic. However, a metallic material is preferred because a metallic honeycomb structure has preferable mechanical strength. Examples of the metal include a stainless steel and metals having compositions of Fe-Cr-Al, Fe-Cr, Fe-Al, Fe-Ni, W-Co and Ni-Cr. Among these metals, Fe-Cr-Al, Fe-Cr and Fe-Al are preferred because of their low costs and their high resistances to heat, oxidation and corrosion. The composition of the honeycomb structure may be those disclosed in U.S. patent application Ser. No. 07/767,889.

The method of manufacturing a honeycomb structure made of a metal is disclosed hereinafter.

First, an iron powder, an aluminum powder, a chromium powder and/or powders of alloys of these metals are mixed to prepare a mixture having a desired composition. Subsequently, the mixture is mixed with an organic binder (e.g. methyl cellulose or polyvinyl alcohol) and water to produce a readily formable mixture, and the readily formable mixture is extruded through an extrusion die to obtain a green compact of a desired honeycomb shape.

When the metal powder mixture is mixed with an organic binder and water, an antioxidant such as oleic acid or the like may be added to the metal powder mixture prior to the addition of the water. Alternatively, powders of metals may have been treated in advance so as to increase oxidation resistance.

Next, the green compact having a honeycomb shape is fired in a non-oxidizing atmosphere at a temperature ranging from 1,000° C. to 1,450° C. to give a honeycomb structure. The atmosphere during the firing step preferably contains hydrogen so that the organic binder is decomposed and removed with iron or the like acting as a catalyst thereby a good sintered body can be obtained.

Firing at a temperature lower than 1,000° C. does not sinter the green compact. On the other hand, firing at a temperature higher than 1,450° C. deform the resulting sintered honeycomb structure.

Preferably, a heat-resistant inorganic oxide such as $Al_2O_3$, $Cr_2O_3$, $ZrO_2$ or the like is coated onto surfaces of partition walls of the sintered honeycomb structure so as to improve the heat resistance, oxidation resistance and corrosion resistance of the sintered body. The inorganic oxide can preferably be coated onto partition walls of the honeycomb structure by one of the following methods.

(1) The sintered body having a metal honeycomb structure is subjected to a heat treatment in an oxidizing atmosphere at a temperature ranging from 700° C. to 1,100° C.

(2) Surfaces or open pores of the partition walls are plated with a metal such as aluminum or the like, and then the sintered body is subjected to a heat treatment in an oxidizing atmosphere at a temperature ranging from 700° C. to 1,100° C. The plating includes electroplating, a gas phase plating, and a physical or chemical vapor deposition.

(3) The sintered honeycomb structure is immersed in a molten metal such as molten aluminum or the like, and then the sintered honeycomb structure is subjected to a heat treatment in an oxidizing atmosphere at a temperature ranging from 700° C. to 1,100° C.

(4) Surfaces of the partition walls of the sintered honeycomb structure is coated with a sol containing a suitable metal such as aluminum or the like, and then the sintered honeycomb structure is subjected to a heat treatment in an oxidizing atmosphere at a temperature ranging from 700° C. to 1,100° C.

Preferably, the above heat treatment is conducted at a temperature ranging from 900° C. to 1,100° C.

Slits are formed in the honeycomb structure so that slits are present between a pair of electrodes for applying electric current to the honeycomb structure.

Means for applying electric current to the honeycomb structure, such as electrodes or the like is fitted to an outer periphery of the honeycomb structure or an inside of the honeycomb structure by brazing, welding or the like so that the electrodes are in electrical contact with the honeycomb structure, thereby a honeycomb heater is produced.

As is readily apparent from the above description, additional advantages and modifications will readily occur to one skilled in the art. The invention in its broader aspects is therefore not limited to the specific examples shown and described. Accordingly, departures may be made from the details shown in the example without departing from the spirit or scope of the disclosed general inventive concept.

EXAMPLE

A Fe powder, a Cr-Al powder (Al: 30% by weight), a Fe-Al powder (Al: 50% by weight), a Fe-B powder (B: 20% by weight) and a $Y_2O_3$ powder, all having an average particle diameter of 44 µm or less was mixed to prepare a mixture having a composition of Fe-12Cr-10Al-0.05B-0.5$Y_2O_3$ (% by weight). This mixture was mixed with 4 grams of methyl cellulose as an organic binder and 1 gram of oleic acid as an antioxidant per 100 gram of the mixture to prepare a readily formable mass. The mass was extruded through an extrusion die to obtain a green compact of a honeycomb structure having a cylindrical shape.

The green compact was dried in the air at 90° C. for 16 hours and then kept in a hydrogen atmosphere at 1,325° C. for 2 hours so as to to sinter the green compact. The sintered honeycomb structure was heat-treated in the air at 1,150° C. for 30 minutes. The resulting honeycomb structure had a porosity of up to 2%.

The honeycomb structure had an outside diameter of 93 mm, a thickness of 38 mm, a thickness of partition walls of 0.1 mm, a cell shape of a square, and a cell density of 500 cells per square inch. The honeycomb structure was cut with a diamond saw to form, as shown in FIG. 1, seven slits 12 in the honeycomb structure parallel to the axial direction of the passages so that a number of cells between two adjacent slits 12 are seven.

Four gaps 14 parallel to the axial direction of the passages are formed to the honeycomb structure. Gaps 14 are perpendicular to the slits 12. A distances between terminations 14d and the front end 16 is 10 mm.

A $\gamma$-$Al_2O_3$ powder and a $CeO_2$ powder were mixed at a weight ratio of 70:30. The mixture was mixed with water and a small amount of nitric acid, followed by wet grinding to prepare a carrier slurry. The honeycomb structure with slits and gaps are dipped in the carrier slurry to coat a washcoat layer on surfaces of partition walls. The honeycomb structure was dried and then fired at 500° C., thereby partition walls were coated with a carrier consisting of γ-Al$_2$O$_3$ and CeO$_2$. The resulting honeycomb structure was immersed in an aqueous solution containing chloroplatinic acid and rhodium nitrate for about 20 minutes so as to load catalytically active components composed of platinum and rhodium of 5:1 (molar ratio), on the carrier consisting of γ-Al$_2$O$_3$ and CeO$_2$. A total loaded amount of platinum and rhodium is 40 gram per square cube of the honeycomb structure.

Next, two electrode bolts were fitted by welding to an outer periphery of the honeycomb structure 10, as shown in FIG. 1. A metallic band was provided to cover the periphery and annular edges of the two ends of the honeycomb structure so that fluid can pass through the central portions, as disclosed in U.S. Pat. No. 5,202,548. A ceramic mat was provided between the metallic band and the honeycomb structure. The honeycomb structure had a diameter of 82 mm for passing fluid therethrough.

Comparative Example

For comparison, a honeycomb heater having the same shape, volume, material, etc. as that of Example except that the honeycomb structure of the Comparative Example does not have a Gap 14.

Durability Test

Each of the honeycomb heaters produced in Example and Comparative Example was arranged in an exhaust tube of an engine installed on a bench. Downstream of the honeycomb heater was arranged a commercial catalyst element having a cylindrical shape of 3.66 inches in diameter and 1.3 liters in volume. The catalyst element includes a monolithic structure and a catalyst composition loaded thereon. Then, a durability test was conducted for 100 hours under conditions that an exhaust gas was introduced into the honeycomb heater at a temperature of 850° C. according to a fuel-cut mode in which the fuel supply to the engine was cut temporarily every one minute.

Test by FTP (Federal Test Procedure)

Each of the honeycomb heaters of Example and Comparative Example was arranged at a manifold position, which is about 400 mm downstream of the discharge port in the exhaust system of an engine of 2,000 cc. A port for introducing secondary air was provided downstream of the honeycomb heater. Downstream of the honeycomb heater was provided the catalyst element subjected to the above durability test. A battery of 12 volts was arranged so as to apply electric current to the honeycomb heater.

BAG emission was measured in accordance with the FTP (Federal Test Procedure). Electric current was applied by the battery to the honeycomb heater for 30 seconds from the moment of engine start. The electric power was 2 kilowatts, and an electric current was about 260 amperes. An electrical resistance was about 30 mΩ. An secondary air was introduced to the exhaust system for 90 seconds from the moment of engine start at a rate of 160 liters/min.

The results are shown in Table 1.

TABLE 1

| | FTP total emission (g/ml) | | |
| --- | --- | --- | --- |
| | HC | CO | NO$_x$ |
| Example | 0.13 | 2.1 | 0.37 |
| Comparative Example | 0.19 | 2.6 | 1.03 |

In the honeycomb heater having a honeycomb structure with gaps, when electric current is applied thereto, a front region of the honeycomb structure free from the gap is heated more quickly than a back region, and the back region of the honeycomb heater of the Example is heated more quickly than the back region of the honeycomb heater of the Comparative Example.

A catalytic converter including such a honeycomb heater as a preheater improves efficiency for removing harmful substances (e.g. nitrogen oxides) in an exhaust gas during the initial running of the engine start.

What is claimed is:

1. A heating element for heating fluid flowing therethrough, comprising:

a honeycomb structure having a periphery, a front end for receiving a fluid flow, a back end through which the fluid flow exits, and a plurality of passages defined by partition walls extending along an axial direction of the honeycomb structure, said honeycomb structure being electrically conductive;

means for applying electric current to said honeycomb structure to heat the fluid flow which passes through said passages from said front end to said back end;

means for heating a front region of the honeycomb structure more quickly than a back region of the honeycomb structure, comprising a depression formed in the back end of the honeycomb structure, the front region of the honeycomb structure extending between the front end and the depression; and a plurality of slits extending through the partition walls and terminating at an end face of said depression.

2. The heating element of claim 1, wherein said means for applying electric current comprises at least two electrodes in electrical contact with said honeycomb structure.

3. The heating element of claim 1, wherein said honeycomb structure further comprises a catalyst composition loaded on at least a portion of said partition walls of said honeycomb structure, said catalyst composition including an inorganic oxide which is resistant to heat, and a catalytically active component loaded on said inorganic oxide, said catalytically active component comprising an element selected from the group consisting of platinum, palladium, rhodium and iridium.

4. The heating element of claim 1, wherein said honeycomb structure is formed by firing a green compact which includes a metal powder.

* * * * *